United States Patent
Sherman

(10) Patent No.: US 12,220,835 B2
(45) Date of Patent: Feb. 11, 2025

(54) BRIDGE FOR USE WITH WOODWORKING CLAMPS AND METHOD OF USE

(71) Applicant: Woodpeckers, LLC, Strongsville, OH (US)

(72) Inventor: Wayne Sherman, Hinckley, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 18/623,360

(22) Filed: Apr. 1, 2024

(65) Prior Publication Data

US 2024/0239002 A1    Jul. 18, 2024

Related U.S. Application Data

(62) Division of application No. 18/329,343, filed on Jun. 5, 2023, now Pat. No. 12,138,821, which is a division of application No. 17/953,912, filed on Sep. 27, 2022, now Pat. No. 11,707,861.

(51) Int. Cl.
| | | |
|---|---|---|
| *B23Q 1/00* | (2006.01) | |
| *B23Q 9/00* | (2006.01) | |
| *B27G 11/00* | (2006.01) | |
| *B27K 5/02* | (2006.01) | |

(52) U.S. Cl.
CPC ........... *B27G 11/00* (2013.01); *B23Q 9/0078* (2013.01); *B27K 5/02* (2013.01)

(58) Field of Classification Search
CPC . B23Q 3/00; B23Q 9/00; B27G 11/00; B27K 5/02
See application file for complete search history.

(56) References Cited

U.S. PATENT DOCUMENTS

| | | |
|---|---|---|
| 529,057 A | 10/1896 | Reilly |
| D165,901 S | 2/1952 | Bloom |
| D232,917 S | 9/1974 | Vincent |
| 3,968,323 A | 7/1976 | Blanchet |
| 4,201,376 A | 5/1980 | Philips |
| 4,320,882 A | 3/1982 | Bachle |
| 4,852,866 A | 8/1989 | Kristoff |
| 6,361,035 B1 | 3/2002 | Collins |
| D539,639 S | 4/2007 | Nagle |
| D629,850 S | 12/2010 | Kojima |

(Continued)

OTHER PUBLICATIONS

Joint Bridge Clamping Pad Set, posted Aug. 16, 2022 [online], [retrieved Sep. 2004]. Retrieved from internet, https://www.youtube.com/watch?v=-mQkqFaKJjM (Year: 2022).

(Continued)

*Primary Examiner* — Lee D Wilson
(74) *Attorney, Agent, or Firm* — Sand, Sebolt & Wernow Co., LPA

(57) ABSTRACT

A woodworking bridge has two base walls or components that enable the bridge to span an abutment or joint between two work pieces. A top surface enables a clamp to engage the bridge to permit the clamp to apply a clamping force to a first work piece and a second work piece on both sides of the joint and prevent the clamp from contacting the joint. This allows any adhesive that oozes from the joint to be cleaned without curing in the top surface and/or the bottom surface of the two work pieces. The work pieces may then be stained without any cured adhesive in the pores of the work pieces where stain is applied.

13 Claims, 8 Drawing Sheets

(56) References Cited

U.S. PATENT DOCUMENTS

| | | |
|---|---|---|
| D680,419 S | 4/2013 | Green |
| D738,711 S | 9/2015 | Tally |
| D758,834 S | 6/2016 | Tally |
| D790,127 S | 6/2017 | Verleur |
| D899,883 S | 10/2020 | Heath, Jr. et al. |
| D953,774 S | 6/2022 | Serhii |
| 11,707,861 B1 * | 7/2023 | Sherman .............. B23Q 9/0078 144/154.5 |
| 2010/0108825 A1 | 5/2010 | Brock |
| 2017/0167209 A1 | 6/2017 | Cordes |
| 2024/0239002 A1 * | 7/2024 | Sherman ................ B27G 11/00 |

OTHER PUBLICATIONS

Woodworking Joint Bridge Clamping Pad, posted Aug. 20, 2022 [online], [retrieved Sep. 4, 2024]. Retrieved from internet, https://www.printables.com/model/262741-woodworking-joint-bridge-clamping-pad/files (Year: 2022).

* cited by examiner

BRIDGE FOR USE WITH WOODWORKING CLAMPS AND METHOD OF USE

CROSS REFERENCE TO RELATED APPLICATIONS

This disclosure is a divisional application of U.S. patent application Ser. No. 18/329,343 filed on Jun. 5, 2023, which is a divisional application of U.S. patent application Ser. No. 17/953,912, filed on Sep. 27, 2022, now U.S. Pat. No. 11,707,861 issued Jul. 25, 2023, the entirety of each of which is incorporated by reference.

TECHNICAL FIELD

This disclosure is directed to woodworking tools. More particularly, the present disclosure relates to woodworking tools that can be used with clamps.

BACKGROUND

Woodworking or carpentry often includes the use of glue or adhesive to join two work pieces, such as two pieces of wood or wood stock, together at a joint. When the two work pieces are wood boards, a woodworker may desire to join them side-by-side at an edge butt joint or an abutment extending longitudinally relative to the length of each respective board.

When joining boards in this manner, the boards are often clamped in both the transverse direction and the vertical direction to prevent the boards from moving (i.e., remaining square) as the glue or adhesive cures. With respect to the transverse direction, a clamp is placed on each respective outer side of the boards to compress the boards together along a transverse axis or in direction along a horizontal plane. This ensures that the boards are compressed or clamped together.

With respect to the vertical direction, clamps are required to clamp the two boards together at the joint to prevent them from shifting and remaining level while the adhesive cures. This ensures that the resultant work piece formed of at least two boards defines a level surface at or across the joint.

However, problems often arise with respect to the clamps that are needed to clamp the boards in the vertical direction. Namely, as the transverse clamp compresses the boards together, there is a tendency for glue or adhesive to ooze or squeeze out of the joint in the vertical direction, both upward and downward from the joint. When the glue or adhesive oozes out of the joint, the vertical clamp can come into contact with the glue or adhesive and inadvertently squeeze the glue into the pores on the top surface and/or the bottom surface of the wood near the joint.

When the adhesive or glue enters the pores of the wood on the top surface and/or bottom surface and then subsequently cures within those pores, it is very difficult for the woodworker to stain the wood where the adhesive or glue has cured within the pores.

SUMMARY

What is needed is an improved woodworking or carpentry tool that allows a woodworker to apply a clamping force in the vertical direction at an abutment or edge butt joint (or any other type of joint) between two work pieces but prevent glue or adhesive from being pressed or clamped into the top surface and/or the bottom surface of the wood near the edge butt joint or abutment. The present disclosure addresses this need and other issued by providing various embodiments of a woodworking bridge that spans an abutment or edge butt joint so that when glue squeezes or oozes out of the abutment or joint due to transverse clamping forces the glue is not pressed into the pores of the wood at top surface and/or the bottom surface near the edge butt joint or abutment. These various embodiments will allow the glue to dry or cure and simply be cut off or sanded away so that the top surface and/or the bottom surface of the wood near the edge butt joint or abutment may be stained without any residual adhesive or glue in the pores near the edge butt joint or abutment.

In one aspect, an exemplary embodiment of the present disclosure may provide a woodworking bridge comprising: a first surface to engage a first work piece; a second surface to engage a second work piece, wherein the first work piece and the second work piece are configured to abut each other at a joint; a wall that spans the joint between the first surface and the second surface, wherein the joint is positioned in a space defined below the wall; a top surface to engage a clamp adapted to permit the clamp to apply a clamping force to the first work piece and the second work piece on both sides of the joint and prevent the clamp from contacting the joint. This exemplary embodiment or another exemplary embodiment may further provide a top wall defining the top surface, wherein the top wall is positioned above the joint. This exemplary embodiment or another exemplary embodiment may further provide a first bottom base wall that defines the first surface, and a first inner edge on the first bottom base wall; a second bottom base wall that defines the second surface, and a second inner edge on the second bottom base wall. This exemplary embodiment or another exemplary embodiment may further provide a first horizontal plane, wherein the first surface and the second surface are coplanar along the first horizontal plane; and a second horizontal plane that is parallel to the first horizontal plane, wherein the top surface lies along the second horizontal plane. This exemplary embodiment or another exemplary embodiment may further provide a first end opposite a second end, wherein the first end is adapted to transfer the clamping force to the first work piece and the second end is adapted to transfer the clamping force to the second work piece. This exemplary embodiment or another exemplary embodiment may further provide a first portion to transfer a first compression force component to the first surface; a second portion to transfer a second compression force component to the second surface; and wherein the first surface and the second surface are in tension relative to each other in response to the first compression force component and the second compression force component.

In another aspect, an exemplary embodiment of the present disclosure may provide a method for a woodworking bridge comprising: applying glue or adhesive at an abutment or edge butt joint (or any other type of joint or contact) between two work pieces; spanning a woodworking bridge over and across an abutment without touching the abutment or joint with the bridge; and clamping the woodworking bridge to the two work pieces. This exemplary embodiment or another exemplary embodiment may further provide contacting a first bottom base wall on the woodworking bridge with a first work piece, wherein the first work piece is one of the two work pieces; and contacting a second bottom base wall on the woodworking bridge with a second work piece, wherein the second work piece is one of the two work pieces. This exemplary embodiment or another exemplary embodiment may further provide positioning a wall of the woodworking bridge over the abutment. This exemplary embodiment or another exemplary embodiment may further provide contacting a clamping pad on the clamp with a surface on the woodworking bridge. This exemplary embodiment or another exemplary embodiment may further provide effecting adhesive to ooze from the abutment; and preventing the adhesive that oozed from the abutment from contacting the portions of the two work pieces that are contacted by the woodworking bridge. This exemplary embodiment or another exemplary embodiment may further provide removing the adhesive that oozed from the abutment; effecting the adhesive to cure within the abutment; and staining the two work pieces after the adhesive has cured. This exemplary embodiment or another exemplary embodiment may further provide effecting a first compression force component to be transferred from the clamp to a first bottom base wall; and effecting a second compression force component to be transferred from the clamp to a second bottom base wall. This exemplary embodiment or another exemplary embodiment may further provide effecting a tension force component to extend between the first bottom base wall and the second bottom base wall.

Lastly, one other particular exemplary embodiment, which differs from the other embodiments described herein based on its the inclusion of additional features that may not required in the other embodiments, may provide a woodworking bridge comprising: a first side opposite a second side defining a first direction therebetween, and a front end oppose a rear end defining a second direction therebetween, and a top opposite a bottom defining a third direction therebetween, wherein the first direction, the second direction, and the third direction are orthogonal to each other; a first bottom base wall defining a first bottom base surface bound by an outer side edge, a front end edge, an inner side edge, and a rear end edge, wherein the outer side edge and the inner side edge are parallel to each other and parallel to the second direction, wherein the front end edge and the rear end edge are parallel to each other and parallel to the first direction, wherein the front end edge and the rear end edge are perpendicular to the outer side edge and the inner side edge; a second bottom wall defining a second bottom base surface bound by an outer side edge, a front end edge, an inner side edge, and a rear end edge, wherein the outer side edge and the inner side edge are parallel to each other and parallel to the second direction, wherein the front end edge and the rear end edge are parallel to each other and parallel to the first direction, wherein the front end edge and the rear end edge are perpendicular to the outer side edge and the inner side edge; wherein the first bottom base surface and the second bottom base surface are spaced apart from each other and are coplanar along a horizontal plane that lies flat and parallel to the second direction; a curved wall defining an arch having a concave surface that spans the space between the first bottom base surface and the second bottom base surface, wherein the curved wall has a first end connected to the inner side edge of the first bottom base surface and the curved wall has a second end connected to inner side edge of the second bottom base surface, and the curved wall having an apex located halfway between the first end and the second end of the curved wall, wherein the curved wall extends 180° around a center point of the space below the curved wall, wherein a radius of the curved wall is uniform to define a semi-circular configuration of the space below the curved wall and between the first bottom base surface and the second bottom base surface; wherein the curved wall extends vertically upward from the inner side edge of the first bottom base wall and extends vertically upward from the inner side edge of the second bottom base wall; a vertical first sidewall defining a vertical first sidewall surface bound by a bottom side edge, a vertical front end edge, an upper side edge, and a vertical rear end edge, wherein the bottom side edge and the upper side edge are parallel to each other and parallel to the second direction, wherein the vertical front end edge and the vertical rear end edge are parallel to each other and parallel to the third direction, wherein the vertical front end edge and the vertical rear end edge are perpendicular to the bottom side edge and the upper side edge; wherein the vertical first sidewall extends vertically upward from the outer side edge of the first bottom base wall; a vertical second sidewall defining a vertical second sidewall surface bound by a bottom side edge, a vertical front end edge, an upper side edge, and a vertical rear end edge, wherein the bottom side edge and the upper side edge are parallel to each other and parallel to the second direction, wherein the vertical front end edge and the vertical rear end edge are parallel to each other and parallel to the third direction, wherein the vertical front end edge and the vertical rear end edge are perpendicular to the bottom side edge and the upper side edge; wherein the vertical second sidewall extends vertically upward from the outer side edge of the second bottom base wall; a first sloped wall defining a first sloped surface bound by an outer side edge, a sloped front end edge, an inner side edge, and a sloped rear end edge, wherein the outer side edge and the inner side edge are parallel to each other and parallel to the second direction, wherein the inner side edge is at a greater vertical height than a vertical height of the outer side edge due to an angular orientation of the first sloped wall relative to the horizontal plane, wherein the first sloped surface lies along a first angular plane that intersects the horizontal plane at a 45° angle, and wherein the sloped front end edge and the sloped rear end edge are parallel to each other, wherein the sloped front end edge and the sloped rear end edge are perpendicular to the outer side edge and the inner side edge; wherein the first sloped wall extends vertically upward and inward from the upper side edge of the vertical first sidewall along the first angular plane at the 45° angle; a second sloped wall defining a second sloped surface bound by an outer side edge, a sloped front end edge, an inner side edge, and a sloped rear end edge, wherein the outer side edge and the inner side edge are parallel to each other and parallel to the second direction, wherein the inner side edge is at a greater vertical height than a vertical height of the outer side edge due to an angular orientation of the second sloped wall relative to the horizontal plane, wherein the first sloped surface lies along a second angular plane that intersects the horizontal plane at a 45° angle, and wherein the sloped front end edge and the sloped rear end edge are parallel to each other, wherein the sloped front end edge and the sloped rear end edge are perpendicular to the outer side edge and the inner side edge; wherein the second sloped wall extends vertically upward and inward from the upper side edge of the vertical second sidewall along the second angular plane at the 45° angle; a top wall defining a top surface bound by an first side edge, a front end edge, a second side edge, and a rear end edge, wherein the first side edge and the second side edge are parallel to each other and parallel to the second direction, wherein the front end edge and the rear end edge are parallel to each other and parallel to the first direction, wherein the front end edge and the rear end edge are perpendicular to the first side edge and the second side edge; wherein the top surface is disposed in a second horizontal plane that lies flat and parallel to the second direction, wherein the second horizontal plane is located above the horizontal plane; a length of the woodworking bridge measured from the first side to the second side, wherein the length is 4 inches; a height of the woodworking bridge measured from the horizontal plane to the second horizontal plane, wherein the height is of the woodworking bridge is 1.5 inches; a width of the woodworking bridge measure from the front end to the rear end, wherein the width of the woodworking bridge is about 1 inch; wherein the radius of the curved wall is measured from the center point to the concave surface, and the radius is 0.75 inches; a first angled web wall extending from the curved wall to the first sloped wall, wherein the first angled web wall lies along a third angular plane that intersects the horizontal plane at the center point at a 30° angle; a second angled web wall extending from the curved wall to the second sloped wall, wherein the second angled web wall lies along a fourth angular plane that intersects the horizontal plane at the center point at a 30° angle; a parting line wall that extends in the first direction between the front end and the rear end, and the parting line wall has a front surface and a rear surface, and the parting line wall intersects the first angled web wall and the second angled web wall; three recesses defined in the front end of the woodworking bridge, wherein the three recesses defined in the front end of the woodworking bridge include: a first recesses bound by the front surface of the parting line wall, the first bottom base wall, the curved wall, the first angled web wall, the first sloped wall, and the vertical first sidewall; a second recesses bound by the front surface of the parting line wall, the curved wall, the second angled web wall, the second sloped wall, the top wall, the first sloped wall, and the first angled web wall; a third recesses bound by the front surface of the parting line wall, the second bottom base wall, the vertical second sidewall, the second sloped wall, the second angled web wall, and curved wall; three additional recesses defined in the rear end of the woodworking bridge, wherein the three additional recesses defined in the rear end of the woodworking bridge include: a fourth recesses bound by the rear surface of the parting line wall, the first bottom base wall, the curved wall, the first angled web wall, the first sloped wall, and the vertical first sidewall; a fifth recesses bound by the rear surface of the parting line wall, the curved wall, the second angled web wall, the second sloped wall, the top wall, the first sloped wall, and the first angled web wall; and a sixth recesses bound by the rear surface of the parting line wall, the second bottom base wall, the vertical second sidewall, the second sloped wall, the second angled web wall, and curved wall; wherein the woodworking bridge is adapted span an abutment or butt joint of two work pieces that are being glued or adhered together along the abutment or butt joint and the woodworking bridge is adapted to be clamped via a clamp.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
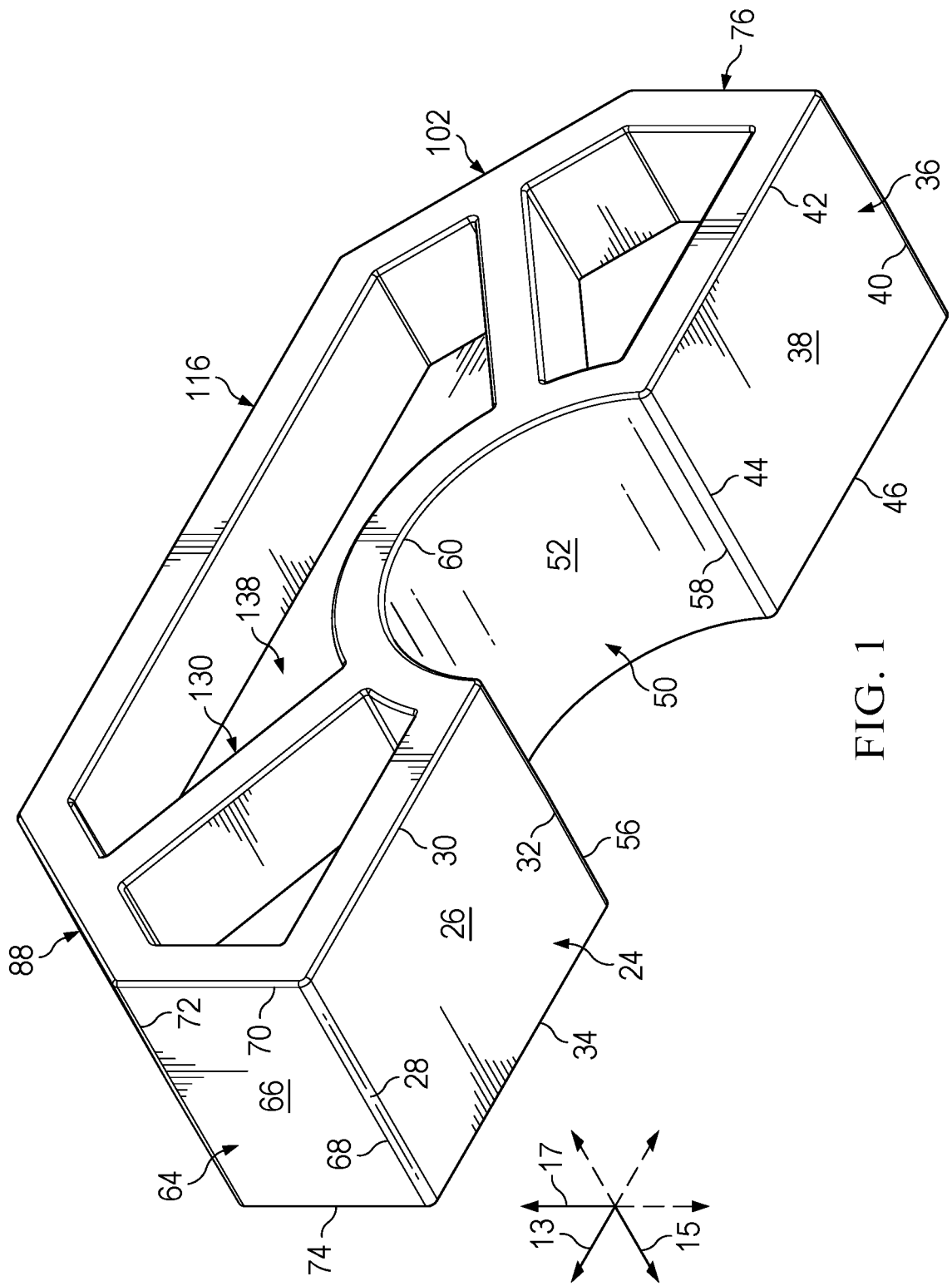
FIG. 1 is a front isometric perspective view of a woodworking joint bridge according to one exemplary embodiment of the present disclosure.
Figure 2:
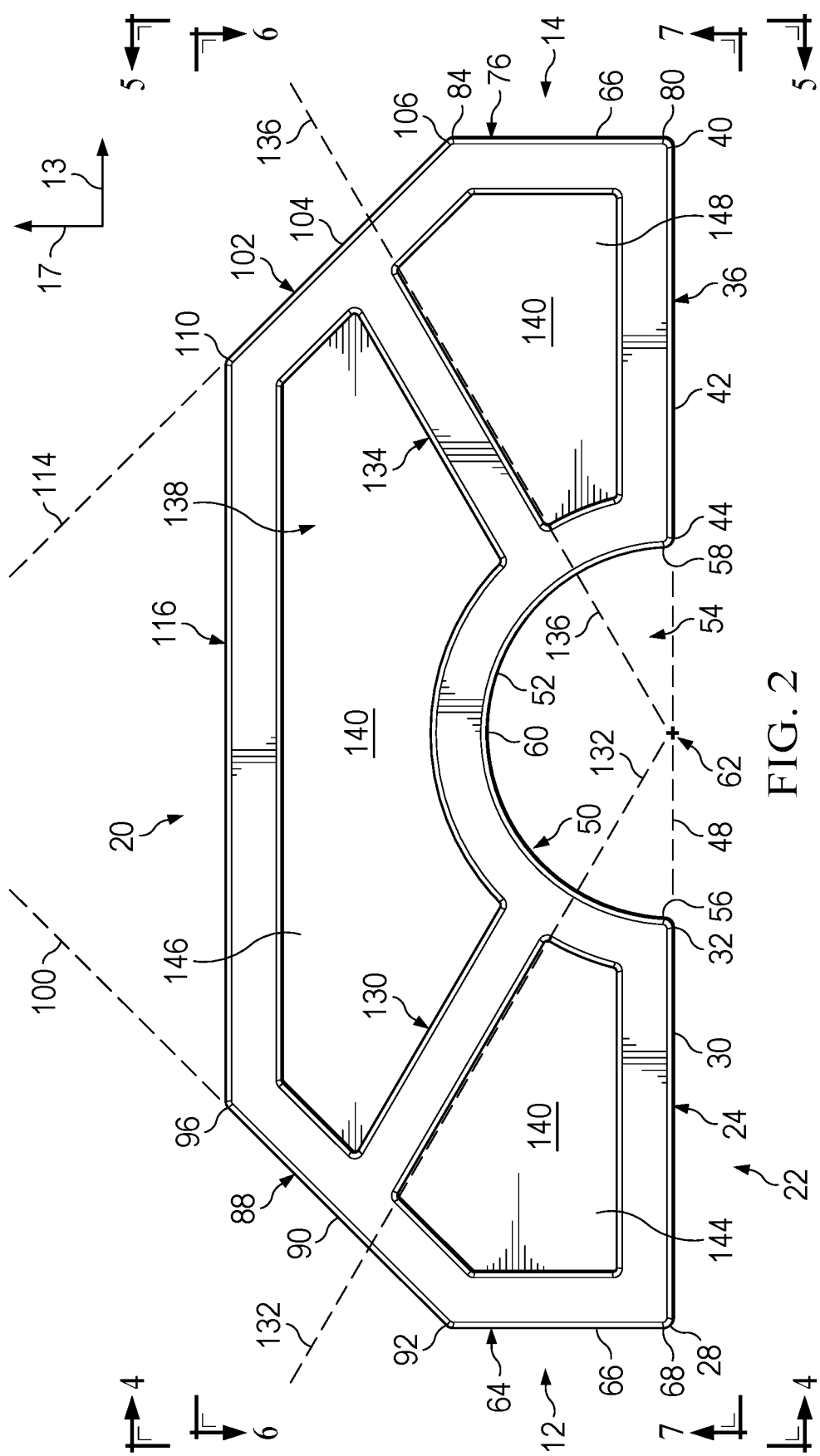
FIG. 2 is a front elevation view of the woodworking joint bridge according to one exemplary embodiment of the present disclosure.
Figure 3:
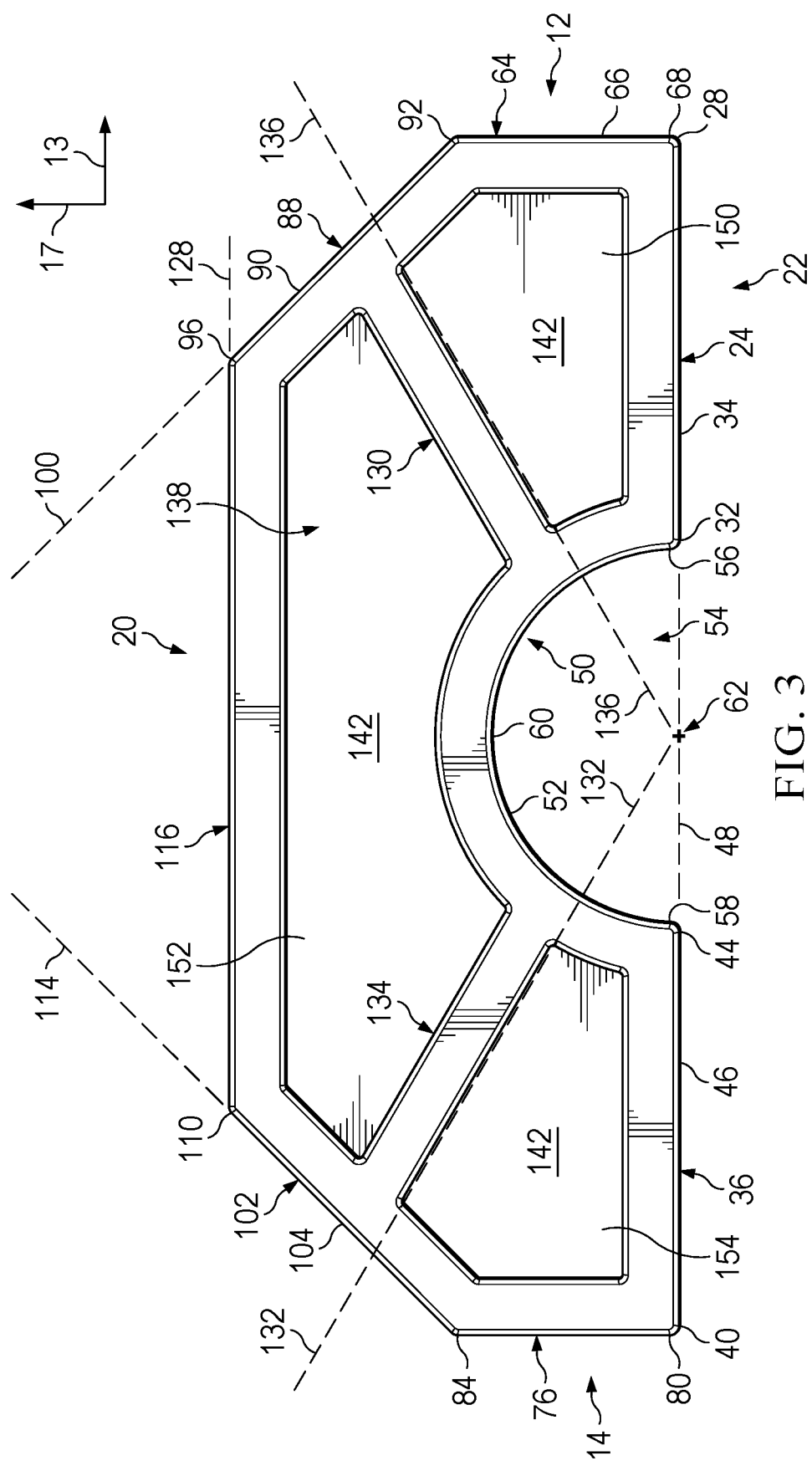
FIG. 3 is a rear elevation view of the woodworking joint bridge according to one exemplary embodiment of the present disclosure.
Figure 4:
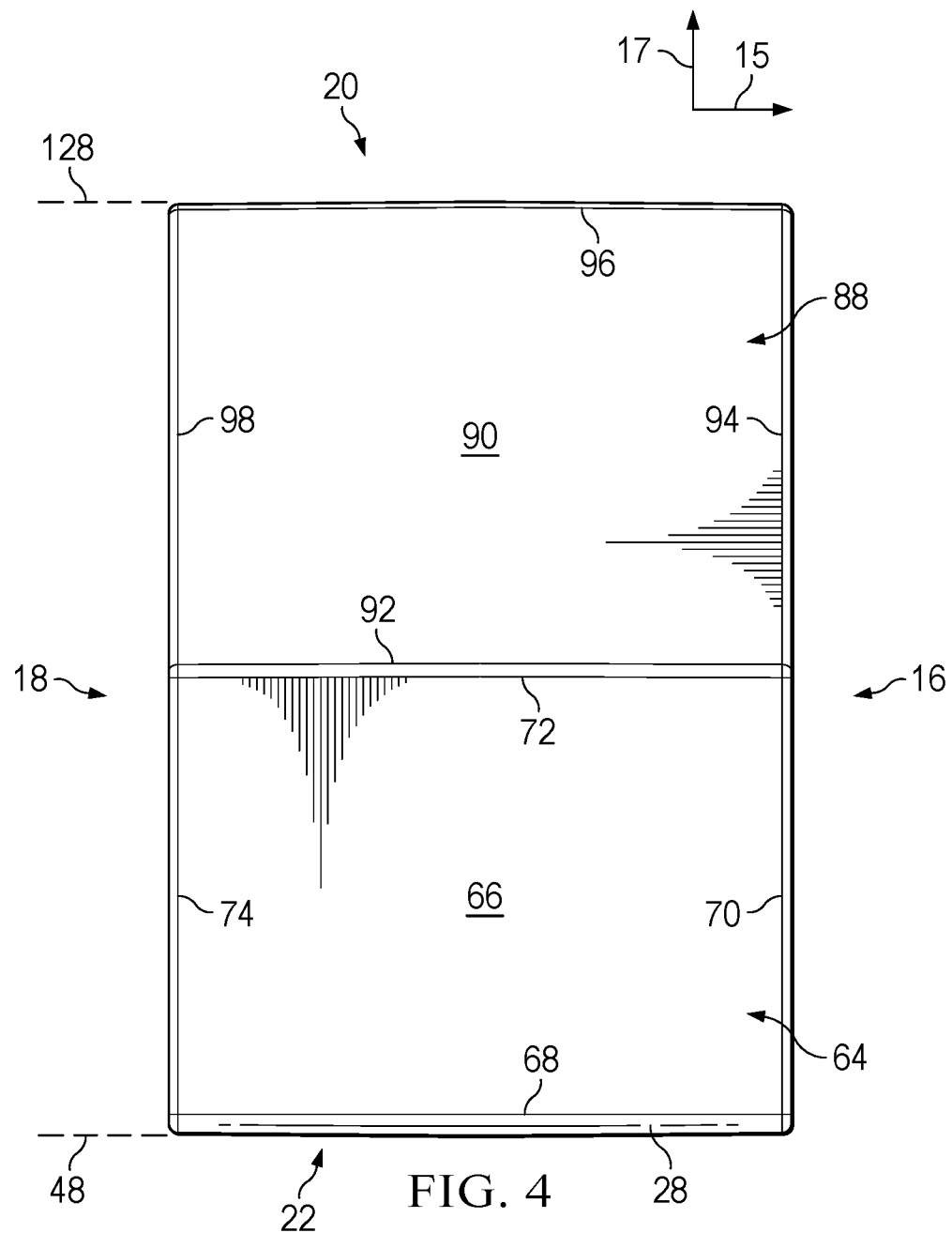
FIG. 4 is a first side elevation view of the woodworking joint bridge taken along line 4-4 in FIG. 2.
Figure 5:
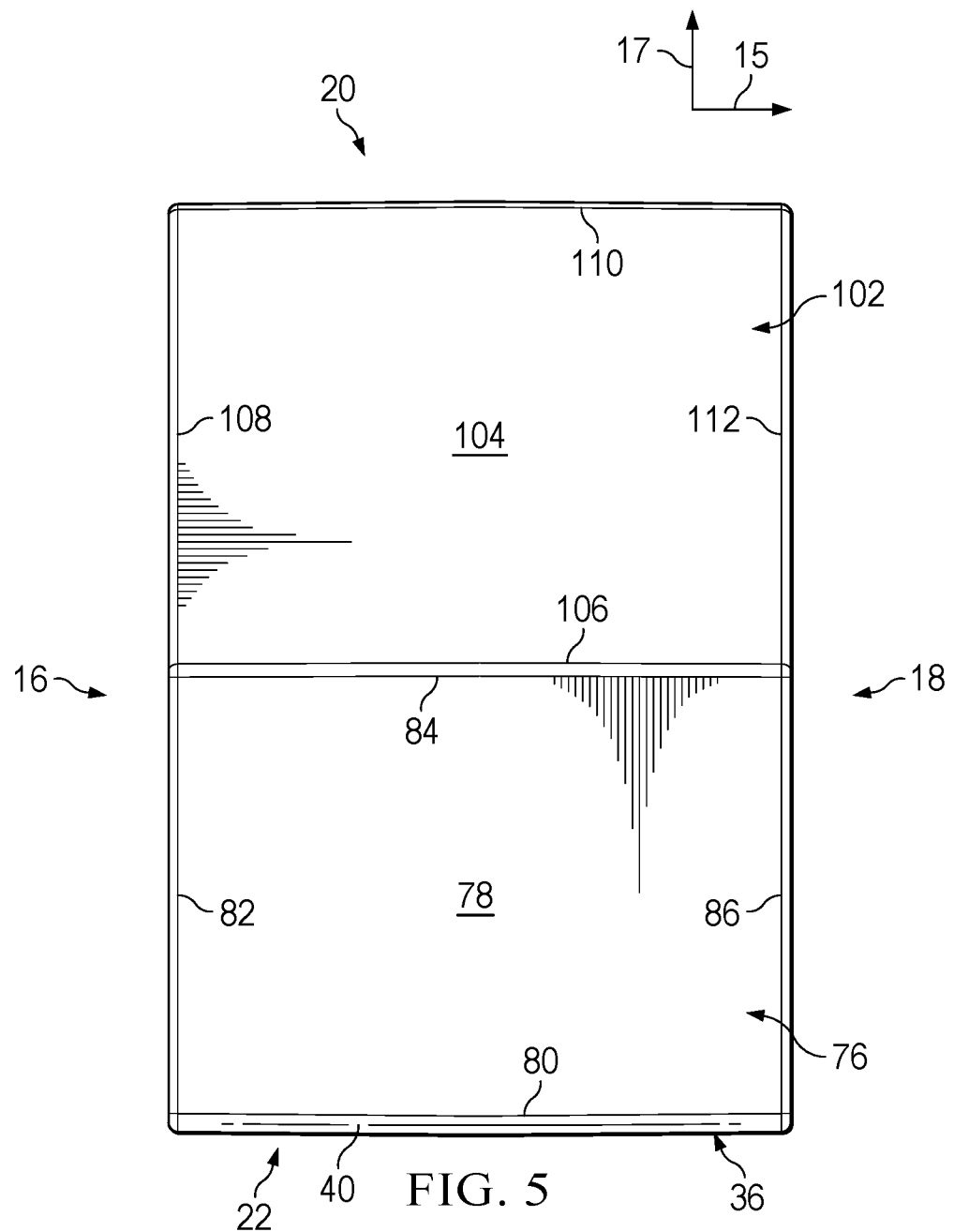
FIG. 5 is a second side elevation view of the woodworking joint bridge taken along line 5-5 in FIG. 2.
Figure 6:
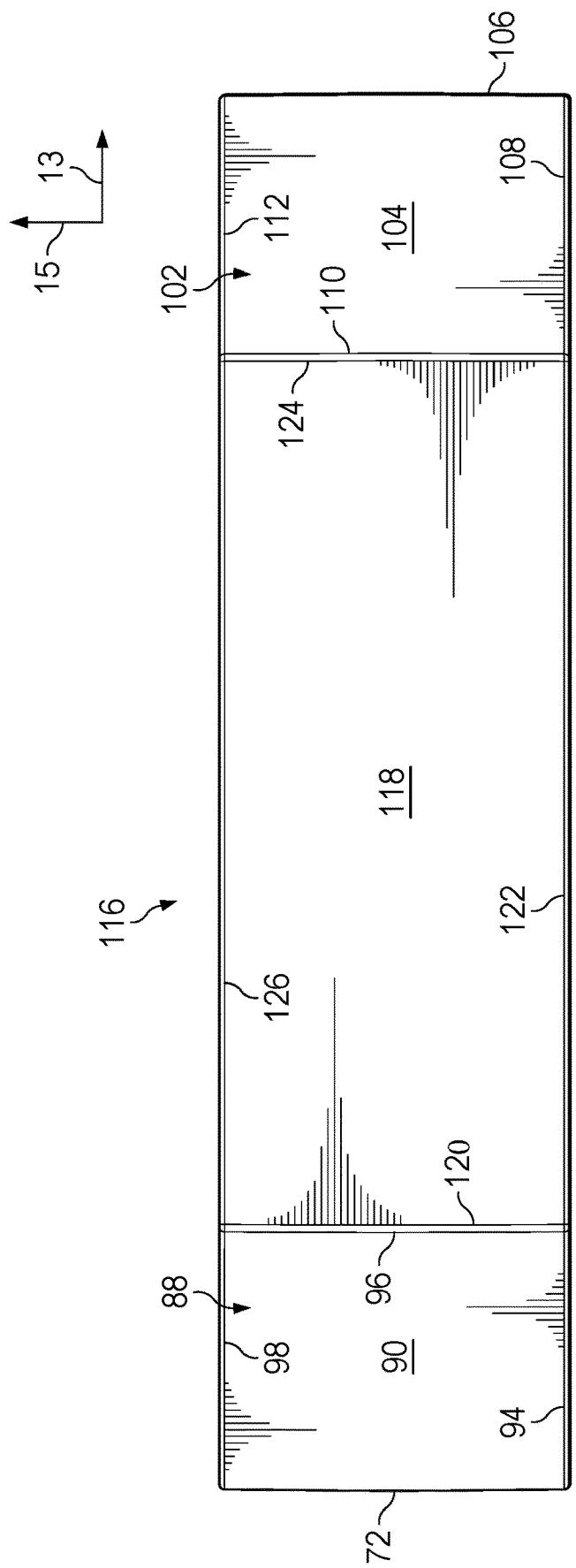
FIG. 6 is a top plan view of the woodworking joint bridge taken along line 6-6 in FIG. 2.
Figure 7:
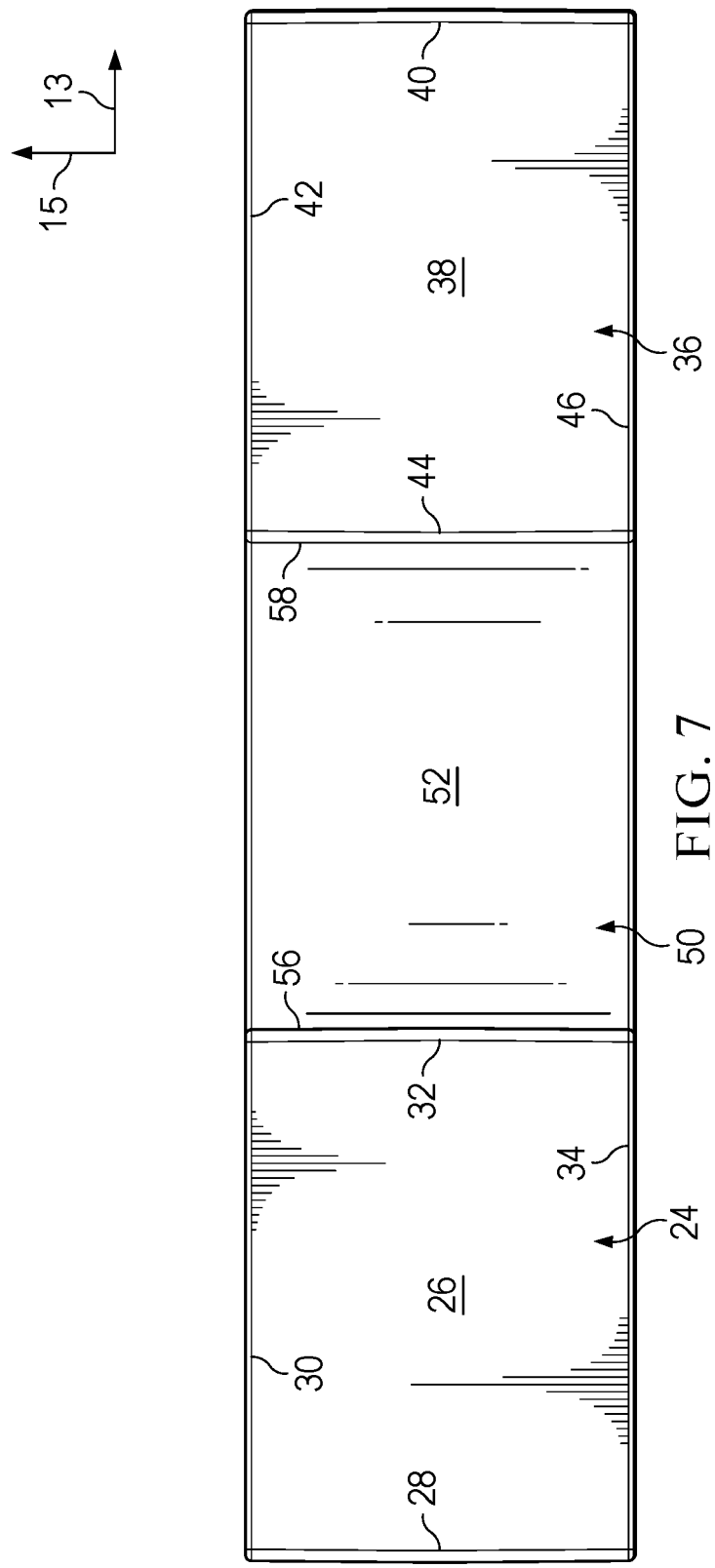
FIG. 7 is a bottom plan view of the woodworking joint bridge taken along line 7-7 in FIG. 2.

FIG. 1-FIG. 8 depict a joint bridge used for woodworking or carpentry generally as bridge 10. Bridge 10 is configured to span a butt joint or another abutment between two work pieces, such as two pieces of wood or board (i.e., wood stock). The bridge 10 spans the joint so that the work pieces may be glued together and clamped but precludes the clamp from contacting the butt joint or abutment to maintain the integrity thereof. The bridge 10 is useful in that it allows two wood work pieces or boards to be glued and clamped together but should reduce the likelihood of glue or adhesive from entering other regions of the work piece, such as the top surface of the work piece or piece of wood. This is beneficial because when glue enters the pores of the wood on the top surface, the dried/cured glue or adhesive within said pores makes it difficult for the wood to be stained. Thus, the bridge 10 functions as a way for a clamp to be used to join two pieces of wood together but eliminates the clamp from directly contacting the joint from the top surface and the bottom surface of said joint, which was problematic in the art because contacting the top surface and the bottom surface of a work piece, such as wood, can squeeze glue or adhesive into the pores of the wood, which then increases the difficulty of staining the wood where that glue seeped or oozed out of the joint and subsequently cures in the pores.

Bridge 10 may be a unibody design. The bridge body or tool body may be a unibody that is integrally extruded, molded, printed, or additively manufactured, removably machined, or formed as a unitary, monolithic member substantially fabricated from a rigid, manmade, material. In one example, metal or metal alloys, such as stainless steel or aluminum alloy, may form a substantial majority of the components or elements used to fabricate the tool body and the various components integrally formed, molded, or extruded therewith. In another example, polymer composite materials, may form a substantial majority or all of the components or elements used to fabricate the tool body and the various components integrally formed, molded, or extruded therewith. The rigid tool body of bridge 10 should withstand typical woodworking handling from an operator pressing the tool body against a piece of wood to be marked and then clamped without damaging the tool body. While it is contemplated that the tool body and its additional components described herein are uniformly and integrally extruded, molded, or formed, it is entirely possible that the components of the rigid tool body be formed separately from alternative materials as one having routine skill in the art would understand. In another example, the tool body may be formed from a semi-rigid elastomeric material or rubber material configured to withstand deformation upon impact or bending by the operator (i.e., a woodworker). Furthermore, while the components of the tool body are discussed below individually, it is to be clearly understood that the components and their corresponding reference elements of the tool body are portions, regions, or surfaces of the body and all form a respective element or component of the unitary tool body of bridge 10. Thus, while the components may be discussed individually and identified relative to other elements or components of the tool body, in this exemplary embodiment, there is a single tool body of bridge 10 having the below described portions, regions, walls or surfaces.

Bridge 10 includes a first side 12 opposite a second side 14 defining a first direction 13 therebetween, and a front end 16 oppose a rear end 18 defining a second direction 15 therebetween, and a top 20 opposite a bottom 22 defining a third direction 17 therebetween, wherein the first direction 13, the second direction 15, and the third direction 17 are orthogonal to each other.

Bridge 10 may include a first bottom base wall 24 defining a first bottom base surface 26 bound by an outer side edge 28, a front end edge 30, an inner side edge 32, and a rear end edge 34, wherein the outer side edge 28 and the inner side edge 32 are parallel to each other and parallel to the second direction 15, wherein the front end edge 30 and the rear end edge 34 are parallel to each other and parallel to the first direction 13, wherein the front end edge 30 and the rear end edge 34 are perpendicular to the outer side edge 28 and the inner side edge 32.

First bottom base wall 24 is depicted as having a rectangular configuration, however other shapes are entirely possible. For example, rather than the first bottom base wall 24 being rectangular, a circular shape or configuration is possible. Still further, any other geometrical shape defining the periphery is possible so long as it forms a base or a foot that is able to engage one work piece or a piece of wood to enable the bridge 10 to span the abutment or butt joint to which a clamp is applied. As such, base wall is configured to only touch one piece of the two work pieces at a single time. Still further, the base wall 24 is configured to engage one work piece or piece of wood without having any adhesive, such as wood glue located between the base wall 24 and the surface of the wood. This should prevent adhesive from entering into the top surface and/or bottom surface of the piece of wood that the base wall 24 is contacting.

When first bottom base wall 24 has a rectangular configuration, it can have a length, measured in the first direction 13 from the outer side edge 28 to the inner side edge 32, that is in a range from about one inch to two inches. In one particular embodiment, the length of the first bottom base wall 24 is about 1⁵⁄₁₆ inches. When bottom base wall 24 has a rectangular configuration, it can have a width, measured in the second direction 15 from the front end edge 30 to the rear end edge 34, that is in a range from about ½ inch to 1.5 inches. In one particular embodiment, the width of the first bottom base wall 24 is about one inch. In other embodiments, regardless of the peripheral shape or configuration of the bottom base wall, the dimension of the surface area of the base wall may be in a range from about 1 in² to about 2 in².

Bridge 10 may include a second bottom wall 36 defining a second bottom base surface 38 bound by an outer side edge 40, a front end edge 42, an inner side edge 44, and a rear end edge 46, wherein the outer side edge 40 and the inner side edge 44 are parallel to each other and parallel to the second direction 15, wherein the front end edge 42 and the rear end edge 46 are parallel to each other and parallel to the first direction 13, wherein the front end edge 42 and the rear end edge 46 are perpendicular to the outer side edge 40 and the inner side edge 44.

Second bottom base wall 36 is depicted as having a rectangular configuration, however other shapes are entirely possible. For example, rather than second bottom base wall 36 being rectangular, a circular shape or configuration is possible. Still further, any other geometrical shape defining the periphery is possible so long as it forms a base or a foot that is able to engage one work piece or a piece of wood to enable the bridge 10 to span the abutment or butt joint to which a clamp is applied. As such, base wall is configured to only touch one piece of the two work pieces at a single time. Still further, the base wall 36 is configured to engage one work piece or piece of wood without having any adhesive, such as wood glue located between the base wall 36 and the surface of the wood. This should prevent adhesive from entering into the top surface and/or bottom surface of the piece of wood that the base wall 36 is contacting.

When the second bottom base wall 36 has a rectangular configuration, it can have a length, measured in the first direction 13 from the outer side edge 40 to the inner side edge 44 that is in a range from about one inch to two inches. In one particular embodiment, the length of the second bottom base wall 36 is about 1⁵⁄₁₆ inches. When bottom base wall 36 has a rectangular configuration, it can have a width, measured in the second direction 15 from the front end edge 42 to the rear end edge 46, that is in a range from about ½ inch to 1.5 inches. In one particular embodiment, the width of the second bottom base wall 36 is about one inch. In other embodiments, regardless of the peripheral shape or configuration of the bottom base wall, the dimension of the surface area of the second base wall may be in a range from about 1 in² to about 2 in².

To ensure that the work pieces that are abutted together maintain a level clamping alignment, the first bottom base surface 26 and the second bottom base surface 34 are spaced apart from each other and are coplanar along a first horizontal plane 48 that lies flat and parallel to the second direction.

Bridge 10 may include a curved wall 50 defining an arch having a concave surface 52 that spans the space 54 between the first bottom base surface 26 and the second bottom base surface 38, wherein the curved wall 50 has a first end 56 connected to the inner side edge 32 of the first bottom base surface 26 and the curved wall 50 has a second end 58 connected to inner side edge 44 of the second bottom base surface 38. The curved wall has an apex 60 located halfway between the first end 56 and the second end 58 of the curved wall 50. The curved wall 50 extends 180° around a center point 62 of the space below the curved wall 50. A radius of the curved wall is uniform to define a semi-circular configuration of the space 54 below the curved wall 50 and between the first bottom base surface 26 and the second bottom base surface 38. The center point 62 lies along the first horizontal plane 48. The radius of the curved wall is measured from the center point 62 to the concave surface 52. In one exemplary embodiment, the radius is ¾ inch.

The curved wall 50 extends vertically upward from the inner side edge 32 of the first bottom base wall 24 and extends vertically upward from the inner side edge 44 of the second bottom base wall 36.

Curved wall 50 is depicted as having a smooth, semi-circular arch configuration, however other shapes are entirely possible. For example, rather than curved wall 50 being smoothly curved, a semi-rectangular, semi-hexagonal, semi-octagonal, or a peaked design (i.e., an inverted V-shaped configuration) could be utilized. Still further, any other geometrical shape defining the arch is possible so long as separates to the two base walls 24, 36 to define space 54 below the arch. The spacing allows a base or a foot to engage one work piece or a piece of wood to enable the bridge 10 to span the abutment or butt joint to which a clamp is applied.

When curved wall 50 has a smooth, semi-circular configuration, it can have a length (or diameter), measured in the first direction 13 through the center point 62 from the first end 56 to the second end 58 that is in a range from about ½ inch to two inches. In one particular embodiment, the length (or diameter) of the curved wall 50 is about 1.5 inches. The curved wall 50 may have the same width as one of or both of the base walls 24, 36. However, it is possible for the curved wall to have a width that differs from one of or both of the base walls 24, 26. In other embodiments, regardless of the shape or configuration of the wall that spans space 54, the dimension of the surface area of that wall may be in a range from about 1.5 $in^2$ to about 2.5 $in^2$.

Bridge 10 may include a vertical first sidewall 64 defining a vertical first sidewall surface 66 bound by a bottom side edge 68, a vertical front end edge 70, an upper side edge 72, and a vertical rear end edge 74. The bottom side edge 68 and the upper side edge 72 are parallel to each other and parallel to the second direction 15. The vertical front end edge 70 and the vertical rear end edge 74 are parallel to each other and parallel to the third direction 17. The vertical front end edge 70 and the vertical rear end edge 74 are perpendicular to the bottom side edge 68 and the upper side edge 72. The vertical first sidewall 64 extends vertically upward from the outer side edge 28 of the first bottom base wall 24.

Vertical first sidewall 64 is depicted as having a rectangular configuration, however other shapes are entirely possible. For example, rather than vertical first sidewall 64 being rectangular, a circular shape or configuration is possible. Still further, any other geometrical shape defining the periphery is possible so long as it forms the side or sidewall of the bridge 10.

When vertical first sidewall 64 has a rectangular configuration, it can have a width, measured in the second direction 15 from the vertical front edge 70 to the vertical rear edge 74, that is in a range from about ½ inch to two inches. In one particular embodiment, the width of the vertical first sidewall 64 is about 1 inch. When vertical first sidewall 64 has a rectangular configuration, it can have a height, measured in the third direction 17 from the bottom side edge 68 to the upper side edge 72, that is in a range from about ½ inch to 1.5 inches. In one particular embodiment, the height of the vertical first sidewall 64 is about ¾ inch. In other embodiments, regardless of the peripheral shape or configuration of the vertical first sidewall, the dimension of the surface area of the vertical first sidewall may be in a range from about 0.5 $in^2$ to about 2 $in^2$.

Bridge 10 may include a vertical second sidewall 76 defining a vertical second sidewall surface 78 bound by a bottom side edge 80, a vertical front end edge 82, an upper side edge 84, and a vertical rear end edge 86. The bottom side edge 80 and the upper side edge 84 are parallel to each other and parallel to the second direction 15. The vertical front end edge 82 and the vertical rear end edge 86 are parallel to each other and parallel to the third direction 17. The vertical front end edge 82 and the vertical rear end edge 86 are perpendicular to the bottom side edge 80 and the upper side edge 84. The vertical second sidewall 76 extends vertically upward from the outer side edge 40 of the second bottom base wall 36.

Vertical second sidewall 76 is depicted as having a rectangular configuration, however other shapes are entirely possible. For example, rather than vertical second sidewall 76 being rectangular, a circular shape or configuration is possible. Still further, any other geometrical shape defining the periphery is possible so long as it forms the side or sidewall of the bridge 10.

When vertical second sidewall 76 has a rectangular configuration, it can have a width, measured in the second direction 15 from the vertical front edge 82 to the vertical rear edge 86, that is in a range from about ½ inch to two inches. In one particular embodiment, the width of the vertical second sidewall 76 is about 1 inch. When vertical second sidewall 76 has a rectangular configuration, it can have a height, measured in the third direction 17 from the bottom side edge 80 to the upper side edge 84, that is in a range from about ½ inch to 1.5 inches. In one particular embodiment, the height of the vertical second sidewall 76 is about ¾ inch. In other embodiments, regardless of the peripheral shape or configuration of the vertical second sidewall, the dimension of the surface area of the vertical second sidewall may be in a range from about 0.5 $in^2$ to about 2 $in^2$.

Bridge 10 may include a first sloped wall 88 defining a first sloped surface 90 bound by an outer side edge 92, a sloped front end edge 94, an inner side edge 96, and a sloped rear end edge 98. The outer side edge 92 and the inner side edge 96 are parallel to each other and parallel to the second direction 15. The inner side edge 96 is at a greater vertical height than a vertical height of the outer side edge 92 due to an angular orientation of the first sloped wall 88 relative to the horizontal plane 48. The first sloped surface 90 lies along a first angular plane 100 that intersects the horizontal plane 48 at a 45° angle. However, other angular orientations are possible, and the angle between first angular plane 100 and horizontal plane 48 may be any angle between 10° and 80°. The sloped front end edge 94 and the sloped rear end edge 98 are parallel to each other. The sloped front end edge 94 and the sloped rear end edge 98 are perpendicular to the outer side edge 92 and the inner side edge 96. The first sloped wall 88 extends vertically upward and inward from the upper side edge 72 of the vertical first sidewall 64 along the first angular plane 100 at the 45° angle.

First sloped wall 88 is depicted as having a rectangular configuration, however other shapes are entirely possible. For example, rather than the first sloped wall 88 being rectangular, a circular shape or configuration is possible. Still further, any other geometrical shape defining the periphery is possible so long as it forms a transitional sidewall of the bridge 10. Alternatively, the first sloped wall does not need to be planar. Rather, there can be a smooth convex or concave transition between the side of the bridge and the top of the bridge 10.

When the first sloped wall 88 has a rectangular configuration, it can have a width, measured in the second direction 15 from the sloped front end edge 94 to the sloped rear end edge 98, that is in a range from about ½ inch to two inches. In one particular embodiment, the width of the first sloped wall 88 is about 1 inch. When first sloped wall 88 has a rectangular configuration, it can have a length, measured along plane 100 from the outer side edge 92 to the inner side edge 96, that is in a range from about ½ inch to 1.5 inches. In one particular embodiment, the length of the first sloped wall 88 measured in the direction along plane 100 is about 1 inch. In other embodiments, regardless of the peripheral shape or configuration of the first sloped wall, the dimension of the surface area of the first sloped wall may be in a range from about 0.5 in$^2$ to about 2 in$^2$.

Bridge 10 may include a second sloped wall 102 defining a second sloped surface 104 bound by an outer side edge 106, a sloped front end edge 108, an inner side edge 110, and a sloped rear end edge 112. The outer side edge 106 and the inner side edge 110 are parallel to each other and parallel to the second direction 15. The inner side edge 110 is at a greater vertical height than a vertical height of the outer side edge 106 due to an angular orientation of the second sloped wall 102 relative to the horizontal plane 48. The first sloped surface lies along a second angular plane 114 that intersects the horizontal plane 48 at a 45° angle. However, other angular orientations are possible, and the angle between second angular plane 114 and horizontal plane 48 may be any angle between 10° and 80°. The sloped front end edge 108 and the sloped rear end edge 112 are parallel to each other. The sloped front end edge 108 and the sloped rear end edge 112 are perpendicular to the outer side edge 106 and the inner side edge 110. The second sloped wall 102 extends vertically upward and inward from the upper side edge 84 of the vertical second sidewall 76 along the second angular plane 114 at the 45° angle.

Second sloped wall 102 is depicted as having a rectangular configuration, however other shapes are entirely possible. For example, rather than second sloped wall 102 being rectangular, a circular shape or configuration is possible. Still further, any other geometrical shape defining the periphery is possible so long as it forms a transitional sidewall of the bridge 10. Alternatively, the second sloped wall does not need to be planar. Rather, there can be a smooth convex or concave transition between the side of the bridge and the top of the bridge 10.

When second sloped wall 102 has a rectangular configuration, it can have a width, measured in the second direction 15 from the sloped front end edge 108 to the sloped rear end edge 112, that is in a range from about ½ inch to two inches. In one particular embodiment, the width of the second sloped wall 102 is about 1 inch. When the second sloped wall 102 has a rectangular configuration, it can have a length, measured along plane 114 from the outer side edge 106 to the inner side edge 110, that is in a range from about ½ inch to 1.5 inches. In one particular embodiment, the length of the second sloped wall 102 measured in the direction along plane 114 is about 1 inch. In other embodiments, regardless of the peripheral shape or configuration of the second sloped wall, the dimension of the surface area of the first sloped wall may be in a range from about 0.5 in$^2$ to about 2 in$^2$.

Bridge 10 may include a top wall 116 defining a top surface 118 bound by a first side edge 120, a front end edge 122, a second side edge 124, and a rear end edge 126. The first side edge 120 and the second side edge 124 are parallel to each other and parallel to the second direction 15. The front end edge 122 and the rear end edge 126 are parallel to each other and parallel to the first direction 13. The front end edge 122 and the rear end edge 126 are perpendicular to the first side edge 120 and the second side edge 124.

The top surface 118 of top wall 116 is disposed in a second horizontal plane 128 that lies flat and parallel to the second direction 15. The second horizontal plane 128 is located above and parallel to the first horizontal plane 48.

Top wall 116 is depicted as having a rectangular configuration, however other shapes are entirely possible. For example, rather than top wall 116 being rectangular, a circular shape or configuration is possible. Still further, any other geometrical shape defining the periphery is possible so long as it forms planar surface that allows a clamp to engage the bridge 10 for clamping two work pieces or wood stocks together while bridge 10 spans the abutment or butt joint. As such, top wall 116 is configured to receive and contact a portion of the clamp.

When top wall 116 has a rectangular configuration, it can have a length, measured in the first direction 13 from the first side edge 120 to the second side edge 124, that is in a range from about 1.5 inches to about 3.5 inches. In one particular embodiment, the length of the top wall is about 2.5 inches. When top wall 116 has a rectangular configuration, it can have a width, measured in the second direction 15 from the front end edge 122 to the rear end edge 126, that is in a range from about ½ inch to 1.5 inches. In one particular embodiment, the width of the top wall 116 is about one inch. In other embodiments, regardless of the peripheral shape or configuration of the top wall, the surface area that engages the clamp is flat and the dimension of this surface area may be in a range from about 1 in$^2$ to about 3 in$^2$.

Overall, bridge 10 can have a length that is oriented parallel to the first direction 13 and measured from the first side 12 (defined by vertical first sidewall 64) to the second side 14 (defined by vertical second sidewall 76). The length may be in a range from about 3 inches to about 6 inches. In one exemplary embodiment, the overall length of the bridge 10 is about 4 inches. Further, bridge 10 may have a height that is oriented parallel to the third direction and measured from the first horizontal plane 48 to the second horizontal plane 128. The height may be in a range from about 1 inch to about 4 inches. In one exemplary embodiment, the overall height of the bridge is about 1.5 inches. Still further, bridge 10 may have a width that is oriented parallel to the second direction 15 and measured from the front end 16 to the rear end 18. The width may be in a range from about 0.5 inch to about 4 inches. In one exemplary embodiment, the overall height of the bridge is about 1 inch.

Bridge 10 may further include a first angled web wall 130 extending from the curved wall 50 to the first sloped wall 88. The first angled web wall lies along a third angular plane 132 that intersects the horizontal plane 48 at the center point 62 at a 30° angle. Bridge 10 may further include a second angled web wall 134 extending from the curved wall 50 to the second sloped wall 102. The second angled web wall 134 lies along a fourth angular plane 136 that intersects the horizontal plane 48 at the center point at a 30° angle.

Bridge 10 may further include a parting line wall 138 that extends in the first direction 13 between the front end 16 and the rear end 18. The parting line wall 138 has a front surface 140 and a rear surface 142. The parting line wall 138 intersects the first angled web wall 130 and the second angled web wall 134. There may be three recesses defined in the front end 16 of bridge 10. The three recesses defined in the front end of bridge 10 can include a first recesses 144 bound by the front surface 140 of the parting line wall 138, the first bottom base wall 24, the curved wall 50, the first angled web wall 130, the first sloped wall 88, and the vertical first sidewall 64. The three recesses defined in the front end of bridge 10 can include a second recesses 146 bound by the front surface 140 of the parting line wall 138, the curved wall 50, the second angled web wall 134, the second sloped wall 102, the top wall 116, the first sloped wall 88, and the first angled web wall 130. The three recesses defined in the front end of bridge 10 can include a third recesses 148 bound by the front surface 140 of the parting line wall 138, the second bottom base wall 36, the vertical second sidewall 76, the second sloped wall 102, the second angled web wall 134, and curved wall 50.

There may be three recesses defined in the rear end 18 of bridge 10. The three recesses defined in the rear end 18 of bridge 10 can include a fourth recesses 150 bound by the rear surface 142 of the parting line wall 138, the first bottom base wall 24, the curved wall 50, the first angled web wall 130, the first sloped wall 88, and the vertical first sidewall 64. The three recesses defined in the rear end 18 of bridge 10 can include a fifth recesses 152 bound by the rear surface 142 of the parting line wall 138, the curved wall 50, the second angled web wall 134, the second sloped wall 102, the top wall 116, the first sloped wall 88, and the first angled web wall 130. The three recesses defined in the rear end 18 of bridge 10 can include a sixth recesses 154 bound by the rear surface 142 of the parting line wall 138, the second bottom base wall 36, the vertical second sidewall 76, the second sloped wall 102, the second angled web wall 134, and curved wall 50.

Figure 8:
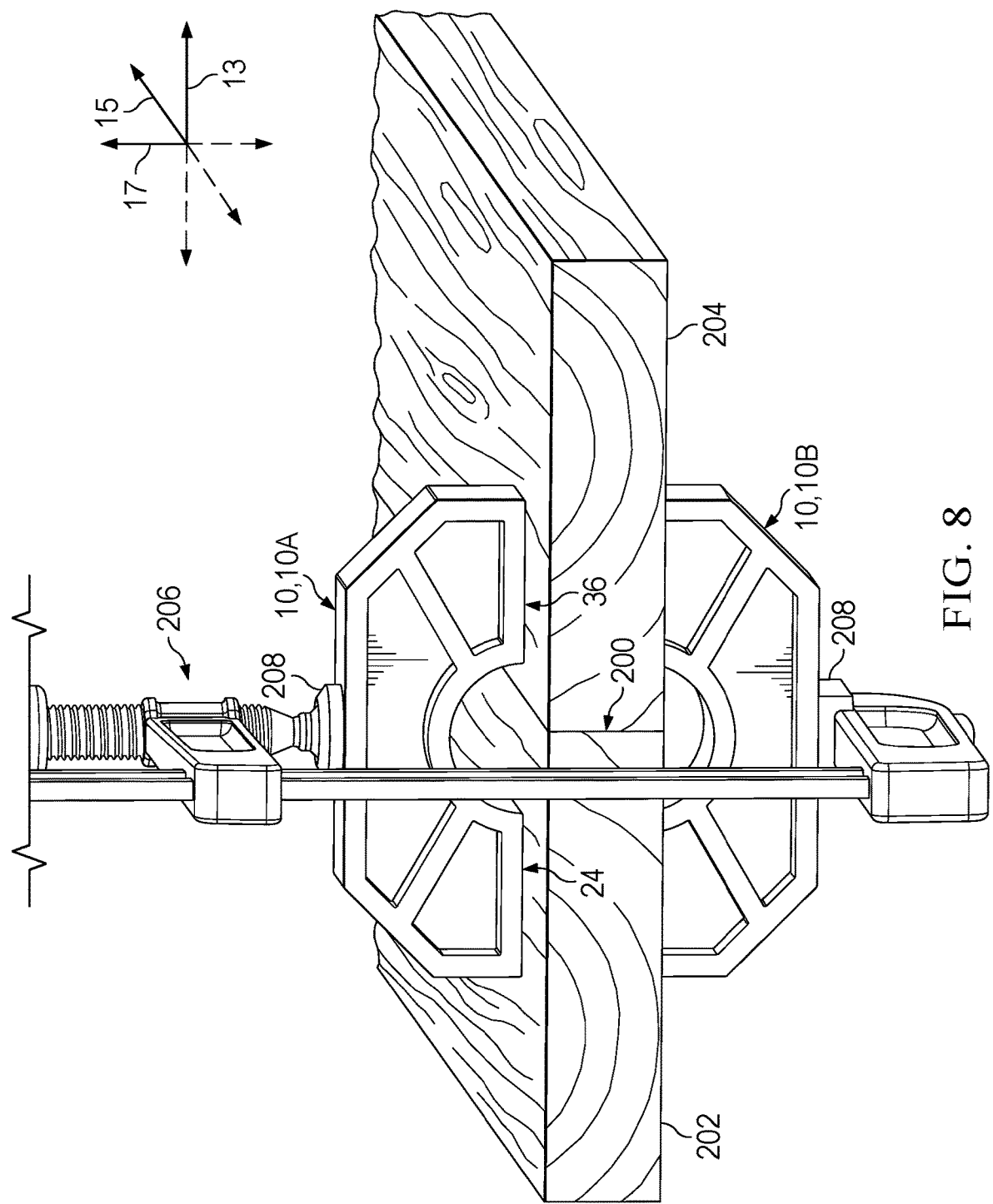
FIG. 8 is a diagrammatic operational view of two woodworking joint bridges holding two pieces of wood stock or work pieces via a C-clamp and the bridges clamping the two joint bridges with the two pieces of wood stock or work pieces.

FIG. 8 depicts a pair of bridges in operation to assist with bridging an abutment or edge butt joint 200 (or any other type of joint) defined between respective sides of a first work piece 202 (i.e., a first wood stock) and a second work piece 204 (i.e., second wood stock). There is a first bridge 10A and second bridge 10B. Each bridge 10A, 10B is identical to bridge 10 described herein.

First, glue or adhesive may be applied to the sides of either one or both of the first work piece 202 and/or the second work piece 204. A horizontal clamp (not shown) may preferably, but optionally, apply a clamping force in a direction parallel to first direction 13 to squeeze first work piece 202 and the second work piece 204 at the butt joint 200.

First bridge 10A is placed atop the work piece such that the bottom wall 24 directly contacts (or indirectly contacts if a pad/cover on the base is desired to be used) the upper surface of the first work piece 202. The bottom wall 36 directly contacts (or indirectly contacts if a pad/cover on the base is desired to be used) the upper surface of the second work piece 204. Bridge 10A spans the butt joint 200 from above by positioning the butt joint 200 in the space 54 below the arch or curved wall 50.

Second bridge 10B is inverted relative to first bridge 10A, and the inverted second bridge 10B is positioned below the work piece such that the bottom wall 24 directly contacts (or indirectly contacts if a pad/cover on the base is desired to be used) the lower surface of the first work piece 202. The bottom wall 36 directly contacts (or indirectly contacts if a pad/cover on the base is desired to be used) the lower surface of the second work piece 204. Bridge 10B spans the butt joint 200 from below by positioning the butt joint 200 in the space 54 defined by the arch or curved wall 50.

Clamp 206 is coupled with bridge 10A and bridge 10B. Namely, the clamp 206 may position its respective clamping pads 208 on the top surfaces 118 of each respective bridge 10A, 10B. Then, claim 206 is operated to exert a clamping pressure in the third direction. When the clamping pressure or clamping force is applied in the third direction, the bridges 10A, 10B behave similar to a truss. This causes or effects a first compression force component to be transferred from the clamp to the first bottom base wall 24 and causes or effects a second compression force component to be transferred from the clamp to the second bottom base wall 36. Then, there is a tension force component that extends in the first direction 13 between the first bottom base wall 24 and the second bottom base wall 36.

Notably, any portion of bridge 10 that is located towards the first side 12 of the bridge (relative to the center point 62) may be considered the "portion" of bridge 10 that effects the first compression force component to be transferred from clamp 206 to the first base wall 24. For example, the portion of the bridge 10 that transfers the first compression force component to the first base wall 24 can be the first sloped wall 88 or the parting line wall, or any other wall. Similarly, any portion of bridge 10 that is located towards the second side 14 of the bridge (relative to the center point 62) may be considered the "portion" of bridge 10 that effects the second compression force component to be transferred from clamp 206 to the second base wall 36. For example, the portion of the bridge 10 that transfers the second compression force component to the second base wall 36 can be the second sloped wall 102 or the parting line wall, or any other wall.

When clamp 206 and the horizontal clamp (not shown) exert clamping force or pressure on the butt joint, there is a tendency for the adhesive or glue (not shown) to ooze or squeeze out of the joint 200. The bridges 10A, 10B assist with precluding the clamp from applying a clamping force directly to the adhesive or glue that is squeezed out or oozes from joint 200. This is beneficial because if the clamping force or pressure was applied directly to the glue adhesive at the joint 200, there would be a tendency for the glue or adhesive to enter the pores of the work pieces 202, 204. If that occurred, the glue or adhesive would cure within those pores which would make the resultant work piece formed form 202 and 204 being glued together difficult to stain at the location that had cured glue or adhesive in those pores. Thus, the bridge 10 or the combination of a pair of bridges 10A, 10B enables a clamping pressure to be applied in the third direction 17, which ensures the that the work pieces 202, 204 remain level or "square" while the adhesive is curing, but that the adhesive or glue will not be forced into the pores of the wood by clamp 206. Then the resultant work piece of the work pieces 202, 204 may be stained by the wood worker without the difficulty of having cured adhesive or glue in the pores of the top surface and/or bottom surface of the resultant work piece.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method for a woodworking bridge, the method comprising:
applying glue or adhesive at a joint between two work pieces;
spanning a woodworking bridge over and across the joint without touching the joint with the woodworking bridge, wherein the woodworking bridge includes a top wall, a first sidewall, a second sidewall, a first bottom base wall, a second bottom base wall, and a wall that spans a space between the first bottom base wall and the second bottom base wall; and
clamping the woodworking bridge to the two work pieces with a clamp, wherein clamping the woodworking bridge includes:
effecting a first compression force component to be transferred from the clamp to the first bottom base wall of the woodworking bridge;
effecting a second compression force component to be transferred from the clamp to the second bottom base wall of the woodworking bridge; and
effecting a tension force component to extend between the first bottom base wall and the second bottom base wall.

2. The method of claim 1, further comprising:
effecting glue or adhesive to ooze from the joint; and
preventing the adhesive that oozed from the joint from contacting the portions of the two work pieces that are contacted by the woodworking bridge;
removing the glue or adhesive that oozed from the joint;
effecting the glue or adhesive to cure within the joint; and
staining the two work pieces after the glue or adhesive has cured.

3. The method of claim 1, further comprising:
contacting the first bottom base wall on the woodworking bridge with a first work piece, wherein the first work piece is one of the two work pieces; and
contacting the second bottom base wall on the woodworking bridge with a second work piece, wherein the second work piece is one of the two work pieces;
wherein the joint is disposed in the space between the first bottom base wall and the second bottom base wall.

4. The method of claim 3, further comprising:
contacting the first bottom base wall on the woodworking bridge with a top surface of the first work piece; and
contacting the second bottom base wall on the woodworking bridge with a top surface of the second work piece;
wherein the woodworking bridge is a first woodworking bridge.

5. The method of claim 4, further comprising:
providing a second woodworking bridge that is identical to the first woodworking bridge;
contacting a first bottom base wall on the second woodworking bridge with a bottom surface of the first work piece; and
contacting a second bottom base wall on the second woodworking bridge with a bottom surface of the second work piece; and
spanning the second woodworking bridge below and across the joint without touching the joint with the second woodworking bridge.

6. The method of claim 5, further comprising:
clamping the second woodworking bridge to the two work pieces and the first woodworking bridge with the clamp, wherein clamping the second woodworking bridge includes:
effecting a third compression force component to be transferred from the clamp to the first bottom base wall of the second woodworking bridge;

effecting a fourth compression force component to be transferred from the clamp to the second bottom base wall of the second woodworking bridge; and effecting a second tension force component to extend between the first bottom base wall and the second bottom base wall of the second woodworking bridge.

7. The method of claim 1, further comprising:

contacting a clamping pad on the clamp with the top wall that defines a surface on the woodworking bridge; wherein the surface that contacts the clamping pad is a flat top surface of the woodworking bridge.

8. The method of claim 1, further comprising:

positioning the wall that spans a space between the first bottom base wall and the second bottom base wall over and above the joint.

9. The method of claim 8, wherein the wall that is positioned over the joint is a curved wall.

10. The method of claim 1, wherein effecting the first compression force component to be transferred from the clamp to the first bottom base wall of the woodworking bridge is accomplished by transferring the first compression force component through a first sloped wall that extends, at least partially, between the top wall of the woodworking bridge and the first bottom base wall of the woodworking bridge.

11. The method of claim 10, wherein effecting the second compression force component to be transferred from the clamp to the second bottom base wall of the woodworking bridge is accomplished by transferring the second compression force component through a second sloped wall that extends, at least partially, between the top wall of the woodworking bridge and the second bottom base wall of the woodworking bridge.

12. The method of claim 11, wherein effecting the first compression force component to be transferred from the clamp to the first bottom base wall of the woodworking bridge is accomplished by transferring the first compression force component through a first angled web that extends, at least partially, between the wall that spans the joint and the first sloped wall.

13. The method of claim 12, wherein effecting the second compression force component to be transferred from the clamp to the second bottom base wall of the woodworking bridge is accomplished by transferring the second compression force component through a second angled web that extends, at least partially, between the wall that spans the joint and the second sloped wall.

* * * * *